United States Patent
Park (10) Patent No.: US 6,654,842 B1
(45) Date of Patent: Nov. 25, 2003

(54) SWAP BAY DEVICE SUPPORTING BOTH MASTER MODE AND SLAVE MODE AND PORTABLE COMPUTER HAVING THE SAME

(75) Inventor: Sang-Woo Park, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 547 days.

(21) Appl. No.: 09/644,641

(22) Filed: Aug. 24, 2000

(30) Foreign Application Priority Data

Aug. 30, 1999 (KR) ......................... 1999-36312

(51) Int. Cl.[7] ............................. G06F 13/00; G06F 9/00
(52) U.S. Cl. ..................... 710/302; 710/301; 710/303; 710/304; 713/1; 713/2; 713/100
(58) Field of Search ................. 710/302, 300–304; 713/1, 2, 100

(56) References Cited

U.S. PATENT DOCUMENTS

| | | | | |
|---|---|---|---|---|
| 5,278,730 A | * | 1/1994 | Kikinis | 361/686 |
| 5,412,666 A | * | 5/1995 | Squires et al. | 714/55 |
| 5,446,877 A | * | 8/1995 | Liu et al. | 714/1 |
| 5,483,419 A | * | 1/1996 | Kaczeus et al. | 361/685 |
| 5,488,572 A | * | 1/1996 | Belmont | 710/62 |
| 5,511,227 A | * | 4/1996 | Jones | 710/9 |
| 5,581,716 A | | 12/1996 | Park | |
| 5,649,233 A | | 7/1997 | Chen | |
| 6,016,518 A | | 1/2000 | Matsushima et al. | |
| 6,024,607 A | | 2/2000 | Wahl | |
| 6,038,624 A | | 3/2000 | Chan et al. | |
| 6,044,423 A | | 3/2000 | Seo et al. | |
| 6,088,794 A | | 7/2000 | Yoon et al. | |

\* cited by examiner

Primary Examiner—Tim Vo
(74) Attorney, Agent, or Firm—Robert E. Bushnell, Esq.

(57) ABSTRACT

A swap bay device for a portable computer with a swap bay has a mode selection switch for selectively setting its operation mode. If the swap bay device is installed in a portable computer supporting one IDE (integrated drive electronics) interface channel, it is set to a slave mode by the mode selection switch. If installed in a portable computer supporting two IDE interface channels, the swap bay device is set to a master slave mode by the switch. Since one swap bay device can be set to a master or slave mode, it can be applied to both the portable computers supporting one and two IDE interface channels. Thus, inventory management of the swap bay device can be efficiently done.

20 Claims, 7 Drawing Sheets

SWAP BAY DEVICE SUPPORTING BOTH MASTER MODE AND SLAVE MODE AND PORTABLE COMPUTER HAVING THE SAME

CLAIM OF PRIORITY

This application makes reference to, incorporates the same herein, and claims all benefits accruing under 35 U.S.C. §119 from an application entitled Swap Bay Device Supporting Both Master and Slave Mode and Portable Computer Having the Same earlier filed in the Korean Industrial Property Office on Aug. 30, 1999, and there duly assigned Serial No. 36312/1999 by that Office.

BACKGROUND OF THE INVENTION

1. Field of the Invention

The present invention relates to a portable computer and, more particularly, to a portable computer having a swap bay device and a swap bay for mounting it.

2. Description of the Art

As an interface for peripheral devices such as a hard disk drive and a CD-ROM (Compact Disc-Read-Only Memory) drive, an integration drive electronics (hereinafter referred to as "IDE") interface has been applied to a computer that is compatible with an IBM PC. The IDE interface supports two independent channels with each channel being able to support one master drive and one slave drive. Therefore, maximally, four IDE devices can be mounted upon a computer system. In a desktop computer, IDE devices of a conventional IDE interface type have jumper pins for setting feasiblely whether the devices are operated in a master or slave mode. Appropriately setting coupling relation of the jumper pins, a user makes the IDE device to be operated in either the master or slave mode.

A portable computer may adopt an IDE interface having two channels, like desktop computers. However, a portable computer may generally have only one or two IDE devices, for example, a hard disk and/or a CD-ROM drive because it does not have enough space for peripheral devices. In a portable computer, a hard disk drive is connected to a primary channel and a CD-ROM drive is connected to a secondary channel and each one of such IDE devices is set to operate in a master mode. This is because, if two IDE devices having different performance are connected to one channel, performance of one IDE device having relatively higher performance is lowered to be equal to that of the other having relatively lower performance.

Usually, a hard disk drive is built in such a portable computer, and a CD-ROM drive is built therein or is swappably provided thereto. A region for mounting swappable IDE devices in a portable computer is called a swap bay, and devices mounted upon the swap bay are called swap bay devices. In most portable computers, a swap bay is generally shared by a floppy disk drive and a CD-ROM drive.

As mentioned above, because IDE devices for a portable computer are operated in a master mode, IDE devices designed only for portable computers are set to be operated in the master mode and do not have additional means for selectively setting the master/slave mode.

Developers of a chipset for use in a portable computer have strived for making the chipset have more improved performance, efficient power consumption, and a smaller size. An example of such chipsets is a 440MX chipset from Intel Corporation. The 440MX chipset includes an IDE controller supporting one IDE interface channel. This is because only one IDE interface channel is sufficient for a portable computer using a maximum of two IDE devices. In such a portable computer, two IDE devices are set differently, with one IDE device set to a master mode and the other to a slave mode. For example, the hard disk drive is set to the master mode and the CD-ROM drive to the slave mode.

In a portable computer supporting two IDE interface channels, an IDE device provided to a swap bay device is set to a master mode and a procedure or device for changing the setting is not provided thereto. Thus, a swap bay device having the ability to set to a slave mode should be supplied to be suitable for a portable computer with one IDE interface channel. The portable computers supporting one IDE interface channel and two IDE interface channels are provided to cause the problem that each intrinsic swap bay device should be fabricated in isolation. Although CD-ROM drives are identically provided to a swap bay device for a portable computer, it is necessary that one is for a portable computer having an IDE interface supporting one channel and the other is for a portable computer having an IDE interface supporting two channels. That is, master/slave mode setting thereof is different. Therefore, portable computer manufacturers have to manufacture swap bay devices that are different from each other. This causes a burden of inefficiency in inventory management.

Exemplars of the art are U.S. Pat. No. 5,581,716 issued to Park for IDE type CD-ROM drive Interfacing Circuit, U.S. Pat. No. 6,016,518 issued to Matsushima et al. for Automatic Master/Slave Designation for Computer Peripherals, U.S. Pat. No. 6,088,794 issued to Yoon et al. for Computer System Capable of Selective Booting from Two Hard DiskDrives, U.S. Pat. No. 5,649,233 issued to Chen for Apparatus for Flexibly Selecting Primary and Secondary Connectors and Master and Slave Cascaded Disk Drives of an IDE Interface, U.S. Pat. No. 6,044,423 issued to Seo et al. for Identification of a Swappable Device in a Portable Computer, U.S. Pat. No. 6,024,607 issued to Wahl for Female Combination Connector, U.S. Pat. No. 6,038,624 issued to Chan et al. for Real-time Hardware Master/Slave Re-initialization. I have noticed that none of the art shows a simple and inexpensive way to make an IDE device compatible with both a single and dual channel IDE interface.

SUMMARY OF THE INVENTION

Therefore, it is an object of the invention to provide a single swap bay device that can be applied to both a portable computer having one IDE interface channel and a portable computer having two, respectively.

It is another object to have a single peripheral device that can communicate with multiple types of computer interfaces.

It is yet another object to have a swap bay device in a portable computer that has a method of changing the interface channels.

It is still yet another object to have a swap bay device that can be manufactured with a single design and yet interface with multiple types of interface cards.

According to one aspect of the invention, a swap bay device having a master/slave mode has a housing that is appropriately mounted upon a swap bay of a portable computer. The housing has a device unit, a connector, and a mode selection switch. The device unit includes swap bay device function circuits. The connector is installed on a lateral of the housing so that it is connected to a connector installed in a portable computer. The mode selection switch is installed on the lateral thereof, and sets the swap bay device to the master or slave mode.

In one embodiment, the swap bay device is an IDE device. If the portable computer supports one IDE interface channel, the IDE device is set to a slave mode. If the portable computer supports two, the IDE device is set to a master mode.

According to another aspect of the invention, a portable computer having a master/slave mode has a swap bay device having a mode selection switch for setting the master/slave mode. The mode selection switch is installed on a lateral of a housing of the swap bay device. A swap bay is made in a body housing of a portable computer, and receives the swap bay device. The swap bay has a means for switching the mode selection switch. The switching means is located at one position corresponding to a location where the mode selection switch is installed on the swap bay device. If the swap bay device is received in the swap bay, the mode selection switch is switched by the switching means.

In another embodiment, the swap bay device is an IDE device. If the portable computer supports one IDE interface channel, the swap bay device is set to a slave mode. If the portable computer supports two, the swap bay device is set to a master mode.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A swap bay device of this invention has a mode selection switch for selectively setting its operation modes, so that it is appropriate for both portable computer having an IDE interface of one channel and a portable computer having an IDE interface having two. The mode selection switch is properly set to a master or slave mode according to the number of the IDE interface channel.

Figure 1:
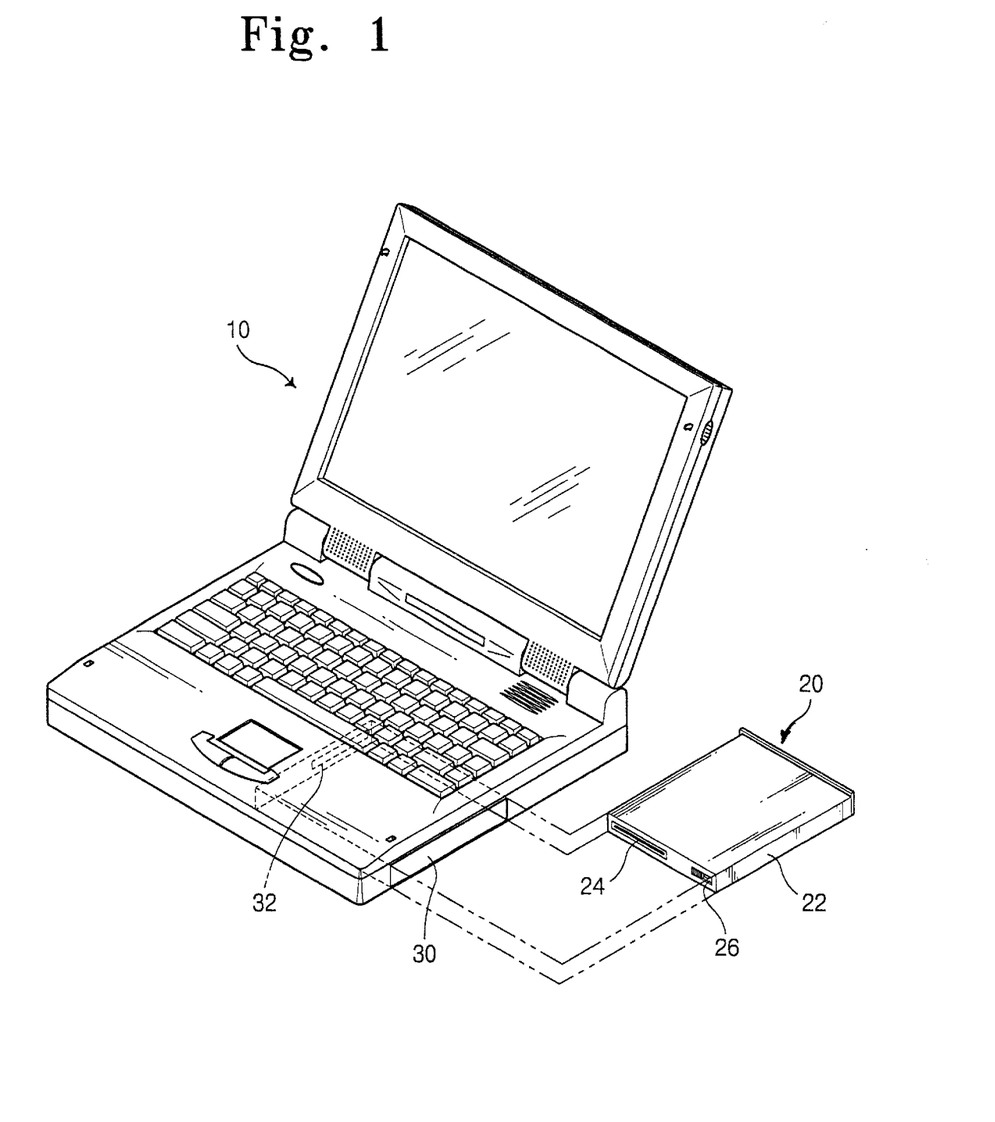
FIG. 1 is a perspective view of a portable computer having a swap bay device received therein in accordance with one embodiment of the invention.

FIG. 1 illustrates a portable computer coupled to a swap bay device in accordance with a first embodiment of the invention. Referring to FIG. 1, a portable computer 10 has a swap bay 30, formed in a body housing, for receiving a swap bay device 20. The swap bay 30 may accommodate various types of disk drives such as hard disk drives, CD-ROM drives, DVD-ROM (Digital Versatile Disc or Digital Video Disc-Read-Only Memory) drives, ZIP (specific type of removable cartridge style data storage device) drives, and other types of data storage drives that have IDE interfaces. The swap bay 30 is also commonly used by a floppy disk drive (not shown) of the computer 10. A connector 32 for connecting the swap bay device 20 is installed in the swap bay 30.

The swap bay device 20 is a computer peripheral device of the IDE interface type, and has a mode selection switch 26 for setting the master/slave mode. A device unit (not shown) is mounted in a housing 22 of the swap bay device 20. A connector 24 fitted for connection to a connector 32 installed in the swap bay 30 is installed on an external rear side of the device 20. The mode selection switch 26 is installed on beside the connector 24. Using the mode selection switch 26, a user can set the swap bay device 20 to the master or slave mode.

Figure 2A:
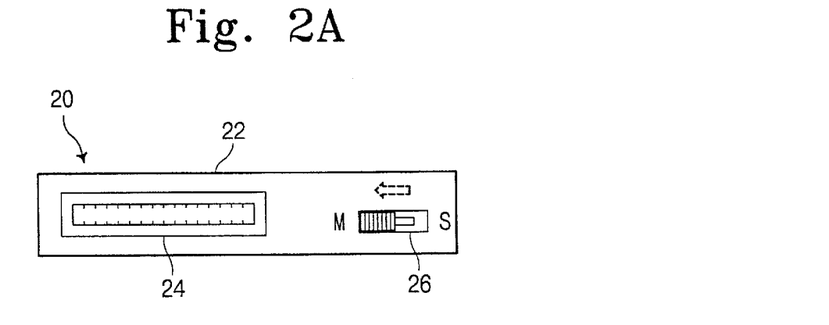
FIGS. 2A and 2B are diagrams illustrating cases where a swap bay device is set to operate in master and slave modes, respectively.
Figure 2B:
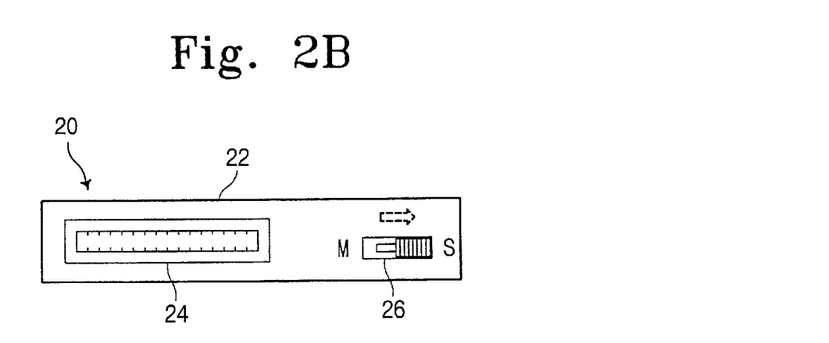

FIG. 2A and FIG. 2B are diagrams illustrating a case where a swap bay device shown in FIG. 1 is selected to a master mode M and a slave mode S, respectively. As shown in FIG. 2A and FIG. 2B, a mode selection switch 26 may be constituted by a dip switch.

Figure 3:
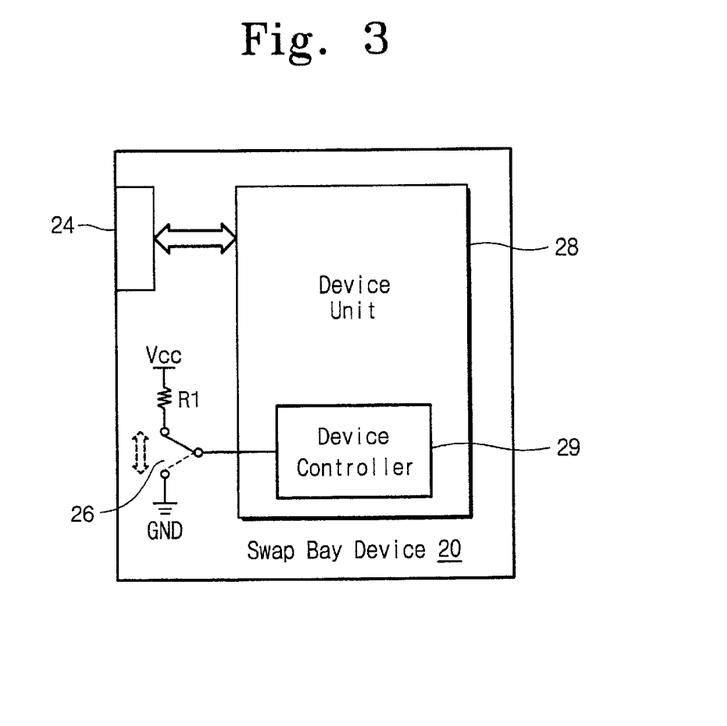
FIG. 3 is a circuit diagram of a master/slave mode selection switch of a swap bay device.

FIG. 3 is a circuit diagram of a master/slave mode selection switch 26 of a swap bay device 20. Referring now to FIG. 3, a swap bay device 20 has a device unit 28, a connector 24, and a mode selection switch 26. The device unit 28 includes various device function circuits such as a device controller 29. The mode selection switch 26 is connected to the device controller 29. If the switch 26 is connected to a ground voltage GND, a low level signal is inputted to the, device controller 29, making the swap bay device 20 set to a master mode. If the switch 26 is connected to a power supply voltage Vcc through a pull-up resister R1, a high level signal is inputted thereto, making the swap bay device 20 set to a slave mode.

Figure 4:
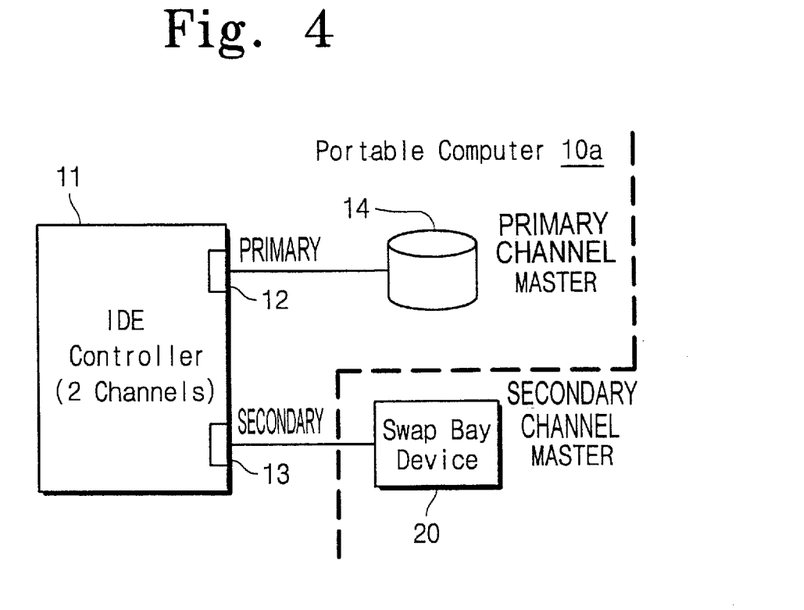
FIG. 4 is a block diagram illustrating a case where a swap bay device is set to operate in a master mode and connected to a portable computer having an IDE controller of two channels.

As shown in FIG. 4, in a portable computer 10a supporting two IDE interface channels, a hard disk drive 14 set to the master mode is connected to a primary channel 12 of an IDE controller 11 having two IDE interface channels. The swap bay device 20 of this invention is set to the master mode, and is connected to a secondary channel 13 of the IDE controller 11.

Figure 5:
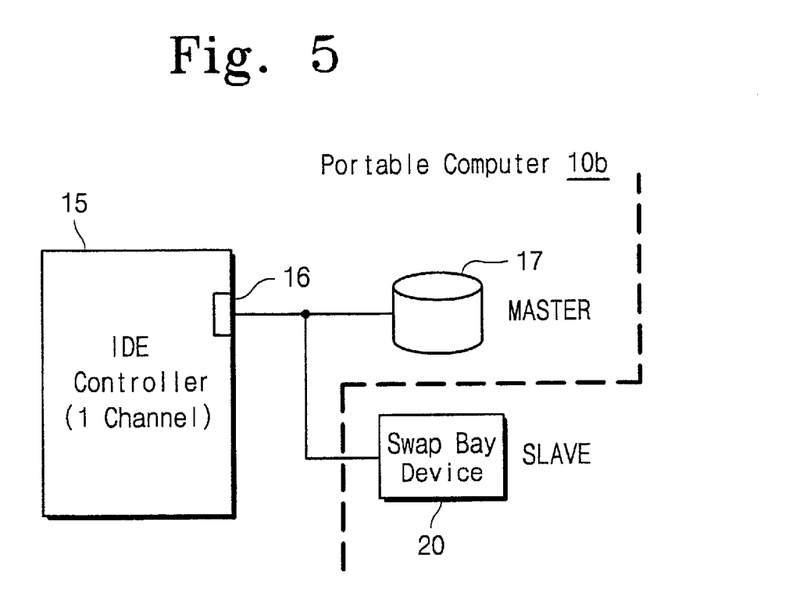
FIG. 5 is a block diagram illustrating a case where a swap bay device is set to operate in a slave mode and connected to a portable computer having an IDE controller of one channel.

As shown in FIG. 5, in a portable computer 10b supporting one IDE interface channel, a hard disk drive 17 set to a master mode is connected to one channel 16 of an IDE controller 15 having one IDE interface channel. The swap bay device 20 of this invention is set to a slave mode, being connected to the channel 16.

Figure 6:
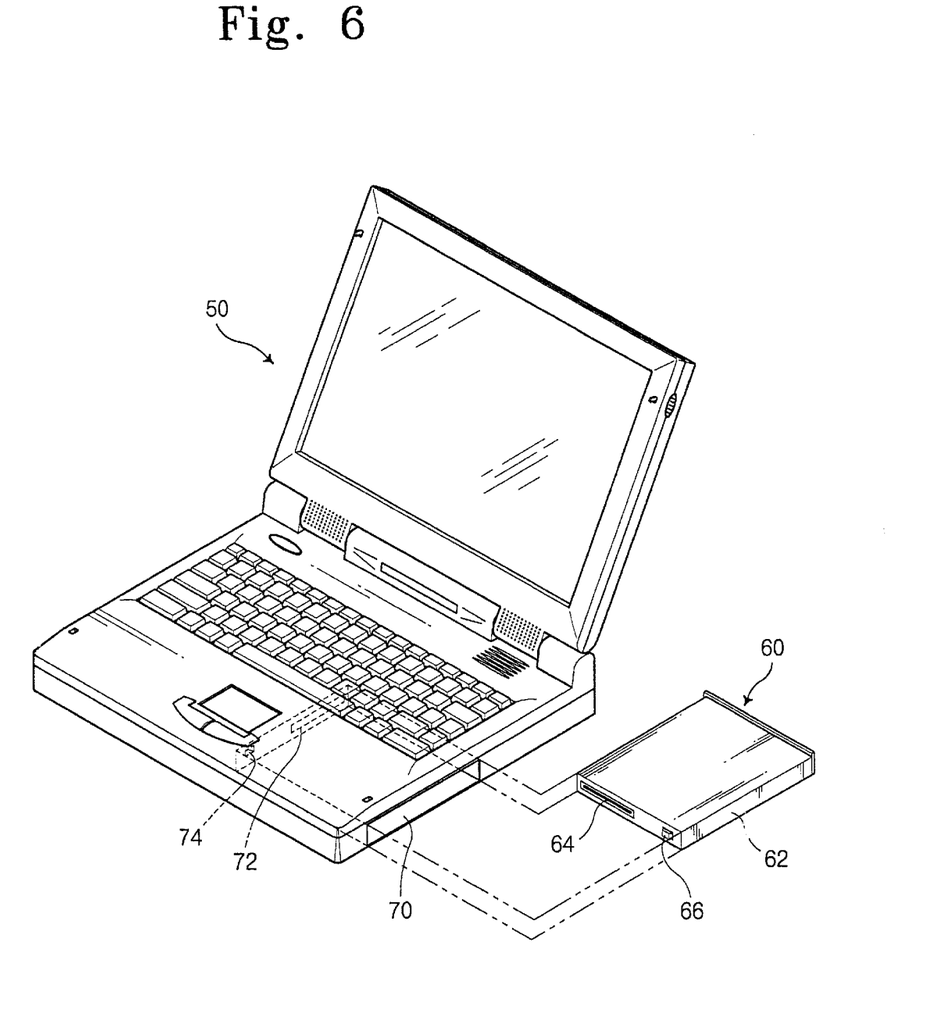
FIG. 6 is a perspective view of a portable computer coupled to a swap bay device in accordance with a second embodiment of the invention.

FIG. 6 illustrates a portable computer coupled to a swap bay device in accordance with a second embodiment of the invention. Referring to FIG. 6, a swap bay device 60 has a mode selection switch 66 for setting a master/slave mode. A connector 64 is installed on a rear side of a housing 62 of a swap bay device 60. The mode selection switch 66 is installed beside the connector 64. The mode selection switch 66 has a button switch 66. If the button switch 66 is pressed, the swap bay device 60 is set to a master mode. If not pressed, the swap bay device 60 is set to a slave mode. A portable computer 50 supports one IDE channel, and has a swap bay 70 formed in a body housing, enabling the swap bay device 60 to properly be received therein.

A connector 72 of the portable computer 50 is properly connected to a connector 64 of the swap bay device 60. The connector 72 of the portable computer 50 is installed on an internal lateral of the swap bay 70. The connector 72 connects to the IDE controller having two channels 11 or having one channel 15. Although the swap bay device 60 is received in the swap bay 70, a groove 74 is formed on the internal lateral corresponding to the mode selection switch so that the mode selection switch 66 may not be pressed. A groove is not formed in a portable computer supporting two IDE interface channels. If the swap bay device 20 of this invention is installed therein, the mode selection switch 66 is pressed to set the swap bay device 60 to the master mode.

Figure 7:
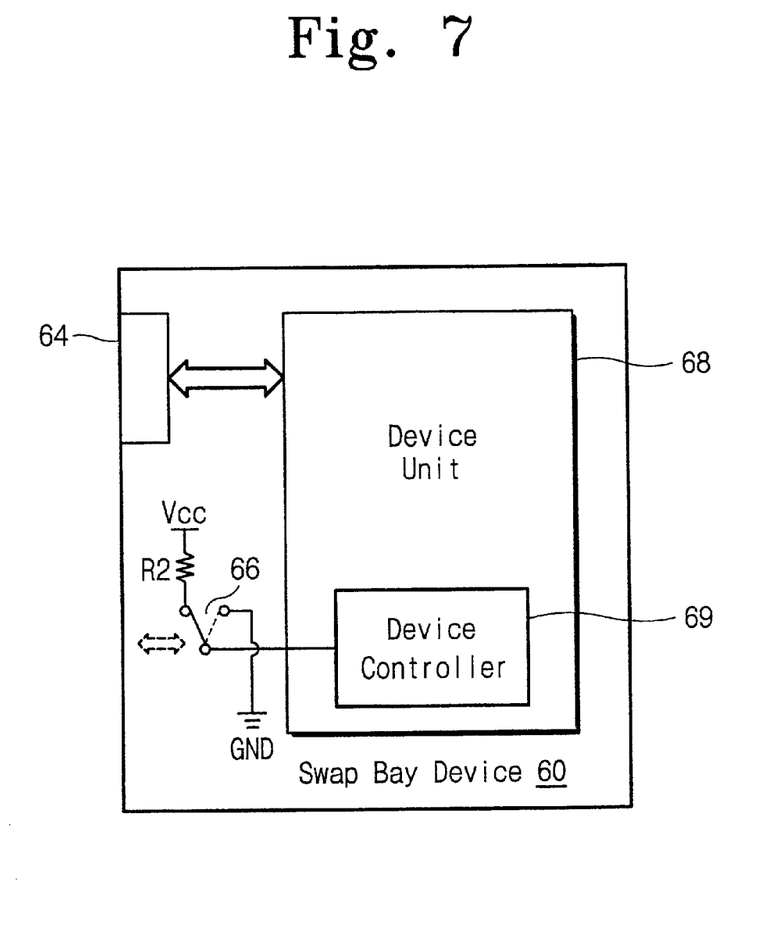
FIG. 7 is a circuit diagram of another master/slave mode selection switch of a swap bay.

FIG. 7 is a circuit diagram of a master/slave mode selection switch of the swap bay device of FIG. 6. Referring now to FIG. 7, a swap bay device 60 has a device unit 60, a connector 64, and a mode selection switch 66. The swap bay device 60 includes various device function circuits such as a device controller 69. The mode selection switch 66 is connected to the device controller 69. If the mode selection switch 66 is not pressed, the switch 66 is connected to a power supply voltage Vcc through a pull-up resister R2. Then, a high level signal is inputted to the device controller 69 and the swap bay device 60 is set to a slave mode. If pressed, the switch 66 is connected to a ground voltage GND. Then, a low level signal is inputted to the device controller 69 and the swap bay device 60 is set to a master mode.

Figure 8:
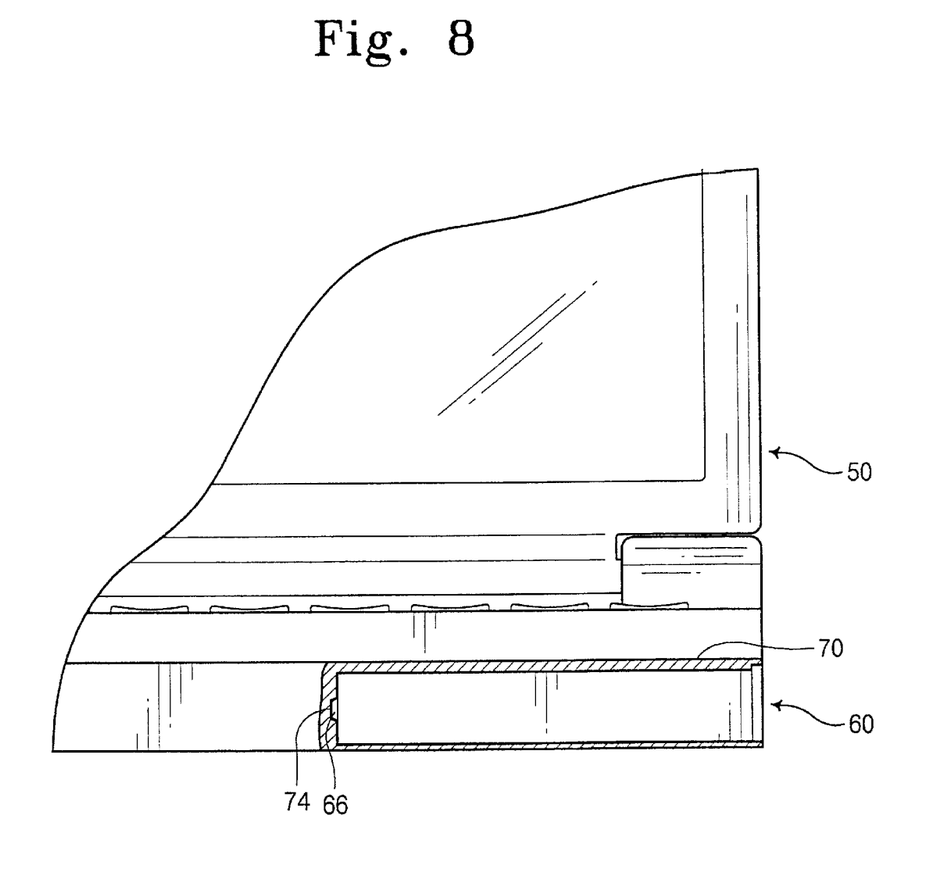
FIG. 8 is a cross-sectional view illustrating a case where a swap bay device is received in a swap bay of a portable computer supporting an IDE interface of one channel.
Figure 9:
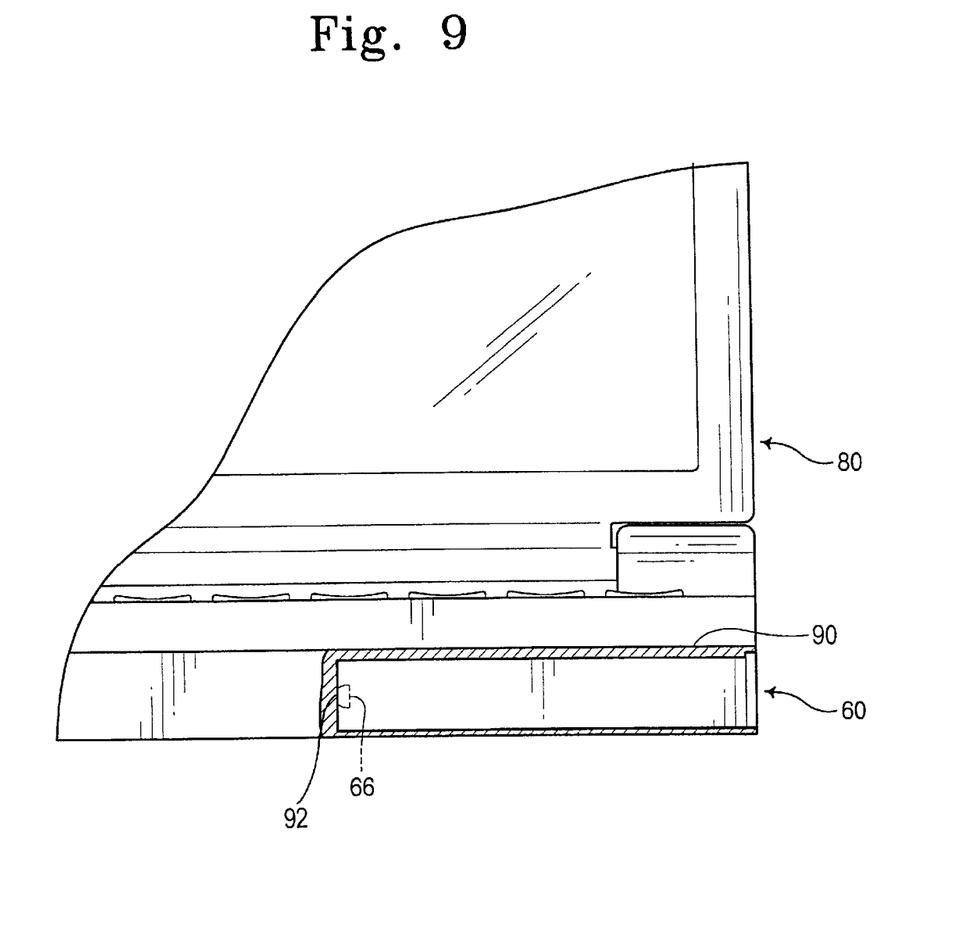
FIG. 9 is a cross-sectional view illustrating a case where a swap bay device is received in a swap bay of a portable computer supporting an IDE interface of two channels.

As shown in FIG. 8, in a swap bay 70 of a portable computer 50 supporting an IDE interface of one channel, a groove 74 is formed at a position corresponding to a mode selection switch 66 of a swap bay device 60. Therefore, the switch 66 is not pressed. As shown in FIG. 9, in a swap bay 90 of a portable computer 80 supporting an IDE interface of two channels, a groove is not formed at a position corresponding to a mode selection switch 66 of a swap bay device 60. For example, a flat surface 92, a protrusion (not shown), or any other surface that can actuate the mode selection switch 66 can be formed. As a result, if the swap bay device 60 is received in the swap bay 70 of the, portable computer 50 supporting one IDE interface channel, the swap bay device 60 is automatically set to the slave mode. If received in the swap bay 90 of the portable computer 80 supporting two IDE interface channels, it is automatically to the master mode.

Although the mode selection switch 66 includes a button switch, it is apparent to those skilled in the art that the switch 66 can be a switch to automatically select the master/slave mode.

According to the invention, since a swap bay device has a mode selection switch for selecting a master/slave mode in automation or manually by hand, it can be applied to both a portable computer supporting one IDE interface channel and a portable computer supporting two. Thus, inventory management can efficiently be done.

While a semiconductor memory device of the present invention is drawn by the foregoing description and drawings, it is merely exemplary, and can variously be changed without departing from the spirit and scope of the present invention.

What is claimed is:

1. A swap bay device, comprising:

a housing mountable upon a swap bay of a portable computer;

a device unit including swap bay device function circuits, said device unit being formed in said housing;

a connector installed on a lateral of said housing to be connected to the swap bay of the portable computer, said connector capable of electrically connecting said device unit with the portable computer; and a mode selection switch setting said device unit to a master or slave mode, the mode selection switch being installed on the lateral of said swap bay device, said swap bay device being set to the slave mode if the portable computer supports one integrated drive electronics device channel, and being set to the master mode if said swap bay device supports two integrated drive electronics device interface channels.

2. The swap bay device of claim 1, with said swap bay device being an integrated drive electronics device, integrated device electronics being a data-transfer interface having control electronics for a disk drive located in said swap bay device.

3. The swap bay device of claim 2, with said mode selection switch setting said swap bay device to a master mode when said mode selection switch is connected to a ground voltage and inputting a low level signal to a device controller, the device controller being in said swap bay device, the device controller controlling said device unit.

4. The swap bay device of claim 2, with said device unit being a disk drive accommodating storage of data.

5. The swap bay device of claim 3, with said mode selection switch setting said swap bay device to a slave mode when said mode selection switch is connected to a power supply voltage through a pull-up resistor and a high level signal being inputted to the device controller.

6. The swap bay device of claim 5, with said mode selection switch being located adjacent to said connector of said swap bay device.

7. A portable computer, comprising:

a swap bay device having a master and slave mode;

a mode selection switch mounted on a lateral of a housing of said swap bay device, said mode selection switch setting either the master or the slave mode;

a swap bay receiving said swap bay device, said swap bay being formed in a main body housing of the portable computer; and a means for switching said mode selection switch being installed in said swap bay in a position corresponding to the location said mode selection switch is installed in said swap bay device, the mode selection switch being switched by said switching means when said swap bay device is received in said swap bay, with the groove being installed on said swap bay when an integrated drive electronics device controller in the portable computer has one channel, the groove shaped and positioned to avoid actuating said mode selection switch, with said means for switching said mode selection switch being a flat surface when the integrated drive electronics device controller has two channels, said flat surface actuating said mode selection switch when said swap bay device is inserted into the portable computer.

8. The portable computer of claim 7, with the swap bay device being an integrated drive electronics device.

9. The portable computer of claim 8, with said means for switching the mode selection switch comprising a groove or a flat surface.

10. The portable computer of claim 8, the swap bay device being set to a slave mode if the portable computer supports two integrated drive electronics interface channels, the swap bay device being set to a master mode when the portable computer supports one integrated drive electronics interface channel.

11. The portable computer of claim 8, with said mode selection switch setting said swap bay device to a master mode when said mode selection switch is connected to a ground voltage by inputting a low level signal to a device controller, the device controller being in said swap bay device, said device controller controlling said device unit.

12. The portable computer of claim 8, with said mode selection switch setting said swap bay device to a slave mode when said mode selection switch is connected to a power supply voltage through a pull-up resistor and a high level signal being inputted to a device controller in said swap bay device, said device controller controlling said device unit.

13. The portable computer of claim 9, with the mode selection switch being a push button switch, the push button having an activation portion protruding from said swap bay device, the groove being installed on said swap bay when an integrated drive electronics device controller in the portable computer has one channel, the groove corresponding in size to the activation portion of the push button switch, the groove avoiding pressing the push button when the swap bay device is inserted into the swap bay.

14. The portable computer of claim 12, with said mode selection switch being a dip switch, said dip switch being a two-position switch housed in a dual in-line package.

15. A method, comprising the steps of:
   mounting a mode selection switch on a lateral of a housing of a swap bay device, said swap bay device having a master and slave mode, said mode selection switch setting either the master or the slave mode;
   receiving said swap bay device in a swap bay, said swap bay being formed in a housing of the portable computer;
   installing a means for switching said mode selection switch in said swap bay in a position corresponding to the location said mode selection switch is installed in said swap bay device, the mode selection switch being switched by said switching means when said swap bay device is received in said swap bay;
   selecting said means for switching the mode selection switch as comprising a groove, the groove being installed on said swap bay when an integrated drive electronics device controller in the portable computer has one channel, the groove shaped and positioned to avoid actuating said mode selection switch; and
   selecting said means for switching said mode selection switch comprising a flat surface when the integrated drive electronics device controller has two channels, said flat surface actuating said mode selection switch when said swap bay device is inserted into the portable computer.

16. The method of claim 15, with said swap bay device being an integrated drive electronics device.

17. The method of claim 16, further comprising the step of selecting said means for switching the mode selection switch as comprising a groove or a flat surface.

18. The method of claim 16, further comprising the step of setting the swap bay device to a slave mode if the portable computer supports two integrated drive electronics interface channels, the swap bay device being set to a master mode when the portable computer supports one integrated drive electronics interface channel.

19. The method of claim 18, with said mode selection switch setting said swap bay device to a master mode when said mode selection switch is connected to a ground voltage and inputting a low level signal to a device controller, the device controller being in said swap bay device and controlling said device unit.

20. The method of claim 19, with said mode selection switch setting said swap bay device to a slave mode when said mode selection switch is connected to a power supply voltage through a pull-up resistor and a high level signal is inputted to the device controller in said swap bay device.

* * * * *